(12) United States Patent
Ho et al.

(10) Patent No.: US 11,067,741 B1
(45) Date of Patent: Jul. 20, 2021

(54) BACKLIGHT MODULE AND ILLUMINATED TOUCH DEVICE THEREOF

(71) Applicant: Chicony Power Technology Co., Ltd., New Taipei (TW)

(72) Inventors: Hsuan-Wei Ho, New Taipei (TW); Chun-Ming Huang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/948,648

(22) Filed: Sep. 25, 2020

(30) Foreign Application Priority Data

Aug. 14, 2020 (TW) .................................. 109127840

(51) Int. Cl.
| | | |
|---|---|---|
| *F21V 8/00* | (2006.01) | |
| *G02F 1/13357* | (2006.01) | |
| *G02F 1/1335* | (2006.01) | |
| *G06F 3/041* | (2006.01) | |

(52) U.S. Cl.
CPC ........... *G02B 6/0078* (2013.01); *G02B 6/008* (2013.01); *G02B 6/0036* (2013.01); *G02B 6/0055* (2013.01); *G02B 6/0066* (2013.01); *G02B 6/0093* (2013.01); *G02F 1/133603* (2013.01); *G02F 1/133606* (2013.01); *G02F 1/133607* (2021.01); *G06F 3/041* (2013.01)

(58) Field of Classification Search
CPC .. G02B 6/0016; G02B 6/0043; G02B 6/0078; G02B 6/008; G02B 6/0055; G02F 1/133603; G02F 1/133606; G02F 1/133607

See application file for complete search history.

(56) References Cited

U.S. PATENT DOCUMENTS

| | | | | |
|---|---|---|---|---|
| 2005/0174803 A1* | 8/2005 | Hayashi | ............... | G02B 6/0016 362/608 |
| 2006/0139960 A1* | 6/2006 | Sakai | .................. | G02B 6/0061 362/623 |
| 2009/0026053 A1* | 1/2009 | Lerenius | ............... | G06F 3/0202 200/314 |

(Continued)

FOREIGN PATENT DOCUMENTS

| | | |
|---|---|---|
| CN | 105892148 A | 8/2016 |
| TW | I414973 B | 11/2013 |

(Continued)

*Primary Examiner* — Keith G. Delahoussaye
(74) *Attorney, Agent, or Firm* — Innovation Capital Law Group, LLP; Vic Lin

(57) ABSTRACT

An illuminated touch device includes a circuit board, a backlight module, and a cover plate. The backlight module includes a light guide plate, a light source assembly, and a light-shielding bar. The light guide plate includes a first plate body and a second plate body fitted with each other. The first plate body has a plurality of first microstructures, and the second plate body has a plurality of second microstructures. The light-shielding bar is at an outer periphery of the light guide plate and extends at an intersection between the first plate body and the second plate body, for blocking penetration of light between the first plate body and the second plate body. The cover plate includes first transparent regions and second transparent regions respectively corresponding to the first microstructures and the second microstructures.

17 Claims, 4 Drawing Sheets

(56) References Cited

U.S. PATENT DOCUMENTS

| | | | |
|---|---|---|---|
| 2011/0205758 A1* | 8/2011 | Kim | F21S 8/04 |
| | | | 362/609 |
| 2012/0147584 A1* | 6/2012 | Wu | H05B 45/20 |
| | | | 362/23.16 |
| 2013/0182458 A1* | 7/2013 | Van Der Lans | G02B 6/0045 |
| | | | 362/613 |
| 2019/0369767 A1 | 12/2019 | Lin et al. | |

FOREIGN PATENT DOCUMENTS

| TW | I631496 B | 8/2018 |
|---|---|---|
| TW | M593001 U | 4/2020 |

* cited by examiner

BACKLIGHT MODULE AND ILLUMINATED TOUCH DEVICE THEREOF

CROSS-REFERENCE TO RELATED APPLICATION

This non-provisional application claims priority under 35 U.S.C. § 119(a) to Patent Application No. 109127840 filed in Taiwan, R.O.C. on Aug. 14, 2020, the entire contents of which are hereby incorporated by reference.

BACKGROUND

Technical Field

The present invention relates to a backlight module and an illuminated touch device thereof, and in particular, to a backlight module and an illuminated touch device thereof suitable for regional display.

Related Art

Traditional electronic products such as a notebook computer usually have physical buttons and touch panels. As a portable electronic product is developed to be increasingly slim, the available space on the product is relatively reduced. Therefore, a thin and light notebook computer may display virtual buttons and a visual image on the touch panel to save a space for the physical buttons and improve user convenience. In other words, the virtual buttons and visual image are displayed, through a backlight module, on the touch panel for a user to operate.

In a specific application scenario, the virtual buttons and visual image displayed by an illuminated touch device may display, for example, but not limited to, a computer function menu for section control, and display a corresponding state. For example, the illuminated touch device may display several volume indicators in regions, for example, when one volume symbol is displayed for the user to view/click, it indicates that a current loudspeaker has a low volume, but when seven volume symbols are displayed for the user to view/click, it indicates that the current loudspeaker has a high volume, and the volume of the loudspeaker may be adjusted in sections through user touch.

However, the inventor realizes that a general illuminated touch device only lights up all light-emitting components or turns off all light-emitting components, such as but not limited to: backlighting or side lighting is used to illuminate an entire region of the touch panel, but still cannot display the virtual buttons and visual images in regions. Even though each light-emitting component may be independently controlled to be individually lit up, there are still problems of adjacent light interference and a residual image, so that the residual image misleads the user. In view of this, the inventor has concentrated on research and finally developed a backlight module and an illuminated touch device thereof in some embodiments of the present invention to overcome defects in the conventional technologies.

SUMMARY

The present invention is intended to provide a backlight module and an illuminated touch device thereof, and in particular, a backlight module and an illuminated touch device thereof suitable for regional display.

In order to achieve the foregoing objective, the present invention provides a backlight module suitable for being electrically connected to a circuit board. The backlight module includes a light guide plate, a light source assembly, and a light-shielding bar. The light guide plate includes a first plate body and a second plate body fitted with each other. The first plate body includes a plurality of first blocks and a plurality of first openings aligned with the plurality of first blocks. The second plate body includes a plurality of second blocks and a plurality of second openings aligned with the plurality of second blocks. The plurality of first blocks has a plurality of first microstructures, and the plurality of second blocks have a plurality of second microstructures. The light source assembly is electrically connected to the circuit board. The light source assembly includes a plurality of first light-emitting components and a plurality of second light-emitting components arranged opposite to each other in a staggered manner. Each of the first light-emitting components has a first light-emitting surface. Each of the second light-emitting components has a second light-emitting surface. The plurality of first light-emitting components respectively protrude from the plurality of first openings and face the plurality of first blocks with the plurality of first light-emitting surfaces, and the plurality of second light-emitting components respectively protrude from the plurality of second openings and face, the plurality of second blocks with the plurality of second light-emitting surfaces. The light-shielding bar is at an outer periphery of the light guide plate and extends at an intersection between the first plate body and the second plate body, for blocking penetration of light between the first plate body and the second plate body.

According to some embodiments of the present invention, an illuminated touch device includes a circuit board, a backlight module, and a cover plate. The circuit board includes a touch circuit. The backlight module includes a light guide plate, a light source assembly, and a light-shielding bar. The backlight module includes a light guide plate, a light source assembly, and a light-shielding bar. The light guide plate includes a first plate body and a second plate body fitted with each other. The first plate body includes a plurality of first blocks and a plurality of first openings aligned with the plurality of first blocks. The second plate body includes a plurality of second blocks and a plurality of second openings aligned with the plurality of second blocks. The plurality of first blocks has a plurality of first microstructures, and the plurality of second blocks have a plurality of second microstructures. The light source assembly is electrically connected to the circuit board. The light source assembly includes a plurality of first light-emitting components and a plurality of second light-emitting components arranged opposite to each other in a staggered manner. Each of the first light-emitting components has a first light-emitting surface. Each of the second light-emitting components has a second light-emitting surface. The plurality of first light-emitting components respectively protrude from the plurality of first openings and face, by using the first light-emitting surface, the plurality of first blocks, and the plurality of second light-emitting components respectively protrude from the plurality of second openings and face, by using the second light-emitting surface, the plurality of second blocks. The light-shielding bar is at an outer periphery of the light guide plate and extends at an intersection between the first plate body and the second plate body, for blocking penetration of light between the first plate body and the second plate body. The cover plate is on the light guide plate. The cover plate includes a plurality of first transparent regions and a plurality of second transparent regions respectively corresponding to the plurality of first microstructures and the plurality of second microstructures.

According to some embodiments of the present invention, there is a plurality of first accommodating spaces corresponding to the plurality of second blocks between the plurality of first blocks, and there are a plurality of second accommodating spaces corresponding to the plurality of first blocks between the plurality of second blocks. The light-shielding bar is in a continuous S-shape at the intersection between the first plate body and the second plate body.

According to some embodiments of the present invention, at least one of the plurality of first light-emitting components is configured to emit first light toward the first block when driven. At least one of the plurality of second light-emitting components is configured to emit second light toward the second block when driven. The first light is blocked by the light-shielding bar at the intersection and does not enter the second block, and the second light is blocked by the light-shielding bar at the intersection and does not enter the first block.

According to some embodiments of the present invention, the first block and the second block have a plurality of light-condensing microstructures respectively parallel to the first light-emitting surface and the second light-emitting surface. The light-condensing microstructure includes a V-shaped groove and a circular arc groove.

According to some embodiments of the present invention, the light guide plate has a plurality of light-eliminating microstructures between the plurality of first openings and the plurality of second openings.

According to some embodiments of the present invention, the circuit board has a plurality of light-absorbing regions. The plurality of light-absorbing regions is adjacent to the plurality of first light-emitting surfaces and the plurality of second light-emitting surfaces.

According to some embodiments of the present invention, a reflective sheet is further included. The reflective sheet is between the circuit board and the light guide plate. The reflective sheet includes a plurality of third openings. An orthographic projection of the plurality of third openings on the light guide plate overlaps the plurality of first openings and the plurality of second openings. The plurality of first light-emitting components and the plurality of second light-emitting components are at the plurality of third openings and protrude from the reflective sheet.

According to some embodiments of the present invention, the first transparent region and the second transparent region are on a same central axis and are bilaterally symmetrical.

Therefore, according to some embodiments, the backlight module and the illuminated touch device thereof use the light-shielding bar that extends at the intersection between the first plate body and the second plate body to block penetration of light between the first plate body and the second plate body, preventing any microstructure from being erroneously illuminated by light from an adjacent plate body and generating a residual image. In other words, when any light-emitting component is lit up in a region/individually, a block in which the light-emitting component is not lit up may prevent simultaneous image display, thereby reducing problems of adjacent light interference and a residual image, so that each block displays a predetermined pattern independently, facilitating view/touch by the user.

The following details are illustrated by using specific embodiments with reference to the accompanying drawings, so that it is easier to understand the purpose, the technical content, the features, and the effects achieved therein.

DETAILED DESCRIPTION

Figure 1:
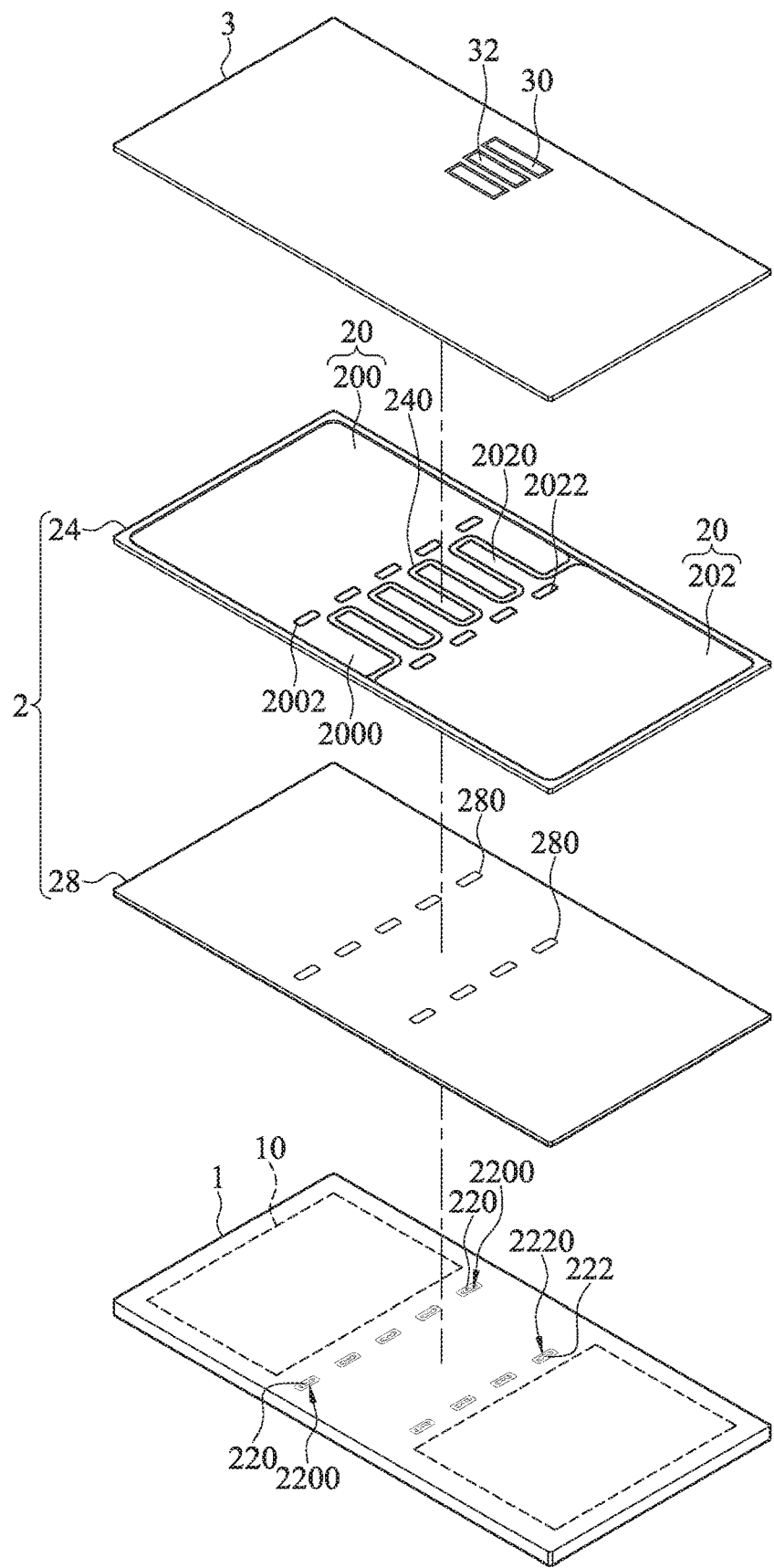
FIG. 1 is a schematic three-dimensional exploded view of an illuminated touch device according to an embodiment.

The embodiments of the present invention will be described in detail below by way of example and with reference to the accompanying drawings. In the specification, numerous specific details are set forth in order to provide a thorough understanding of the present invention. However, the present invention may be practiced without some or all of the specific details. The same or similar components in the drawings will be denoted by the same or similar symbols. It should be noted that the accompanying drawings are only schematic, and do not represent the actual size or quantity of components. Some details may not be completely drawn, so as to keep the accompanying drawings concise.

Figure 2:
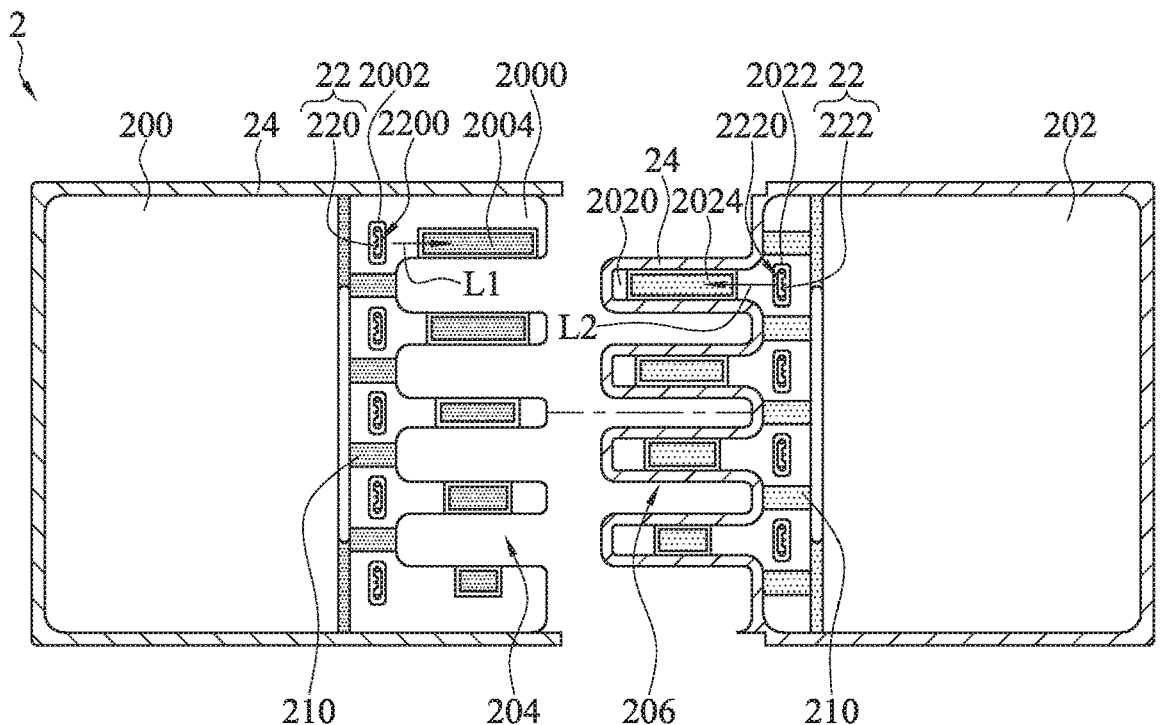
FIG. 2 is a schematic exploded top view of a backlight module according to an embodiment.
Figure 3:
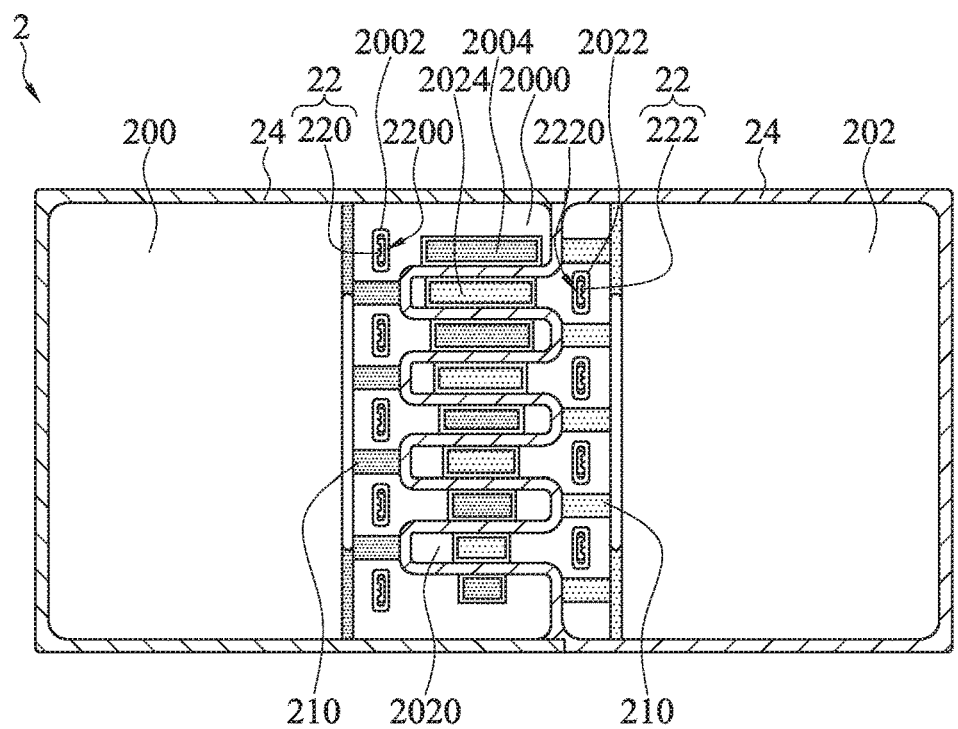
FIG. 3 is a schematic top view of a backlight module according to an embodiment.

FIG. 1 is a schematic three-dimensional exploded view of an illuminated touch device according to an embodiment. FIG. 2 is a schematic exploded top view of a backlight module according to an embodiment. FIG. 3 is a schematic top view of a backlight module according to an embodiment.

Referring to FIG. 1 to FIG. 3, according to some embodiments of the present invention, an illuminated touch device includes a circuit board 1, a backlight module 2, and a cover plate 3.

In some embodiments, the illuminated touch device is a multifunctional touch panel combining a touch panel and a backlight module, and has at least three operation modes: (1) in a normal mode, when a multilayer illuminated touch device does not emit light, the multilayer illuminated touch device appears opaque and looks not different from a normal touch panel, and may be configured to manipulate a mouse cursor, click to select, and control; (2) in a full-region lighting mode, the illuminated touch device can display all virtual buttons and visual images for a user to view; and (3) in a regional display mode, the illuminated touch device may selectively display a part of the virtual buttons and/or visual images, such as but not limited to: displaying virtual buttons for selecting system functions (such as a volume, a rotating speed of a fan, screen brightness, keyboard brightness, or a software joystick) in a peripheral region, and displaying operation images such as a working state of a selected function in a central region. For example, in an application of the foregoing notebook computer, a controller of the notebook computer performs process according to a touch signal returned by the illuminated touch device when a corresponding virtual button/operation image is pressed, for example: the user first selects a virtual volume button of the system function, and then adjusts a corresponding parameter value of the system function by touching an operation image, thereby adjusting a volume of a loudspeaker of the notebook computer. In some embodiments, the illuminated touch device is configured to display the foregoing operation image for the user to visually determine a current working state of hardware/software, but has no corresponding touch function.

The circuit board 1 includes a touch circuit 10. In some embodiments, the circuit board 1 is a flexible printed circuit board. For example, the circuit board 1 is a glass fiber (FR4/FR5/FRP) printed circuit board.

The backlight module 2 is located on the circuit board 1. The backlight module 2 includes a light guide plate 20, a light source assembly 22, and a light-shielding bar 24. The light guide plate 20 is located on the circuit board 1. The light guide plate 20 includes a first plate body 200 and a second plate body 202 fitted with each other, such as but not limited to, opposite outer edges of the first plate body and the second plate body have a concave-convex shape and are fitted with each other.

As shown in FIG. 2, the first plate body 200 has a plurality of first blocks 2000 extending toward the second plate body 202. The plurality of first blocks 2000 are separated from each other and arranged side by side. The first plate body 200 further has a plurality of first openings 2002 penetrating through the plate body along a thickness direction. Each first opening 2002 is aligned with each first block 2000. In other words, the first plate body 200 includes a plurality of first blocks 2000 and a plurality of first openings 2002 aligned with the plurality of first blocks 2000.

The second plate body 202 has a plurality of second blocks 2020 extending toward the first plate body 200. The plurality of second blocks 2020 are separated from each other and arranged side by side. The second plate body 202 further has a plurality of second openings 2022 penetrating through the plate body along a thickness direction. Each second opening 2022 is aligned with each second block 2020. In other words, the second plate body 202 includes a plurality of second blocks 2020 and a plurality of second openings 2022 aligned with the plurality of second blocks 2020.

As shown in FIG. 2, the light source assembly 22 is electrically connected to the circuit board 1. The light source assembly 22 includes a plurality of first light-emitting components 220 and a plurality of second light-emitting components 222 arranged opposite to each other in a staggered manner. In some embodiments, the first light-emitting component 220 and/or the second light-emitting component 222 may be, but not limited to, a light-emitting diode.

Each of the first light-emitting components 220 has a first light-emitting surface 2200 configured to emit first light L1. The plurality of first light-emitting components 220 respectively protrude from the plurality of first openings 2002. The plurality of first light-emitting components 220 face the plurality of first blocks 2000 with first light-emitting surface 2200, so that the first light L1 is incident to the first block 2000 to generate total reflection.

Each of the second light-emitting components 222 has a second light-emitting surface 2220 configured to emit second light L2. The plurality of second light-emitting components 222 respectively protrude from the plurality of second openings 2022. The plurality of second light-emitting components 222 face the plurality of second blocks 2020 with the second light-emitting surface 2220, so that the second light L2 is incident to the plurality of second blocks 2020 to generate total reflection.

Each of the first blocks 2000 has a first microstructure 2004, and each of the second blocks 2020 has a second microstructure 2024. Therefore, the first plate body 200 receives the first light L1 emitted by the first light-emitting component 220, so that the first light L1 enters an interior of the first plate body 200 for total reflection, and the first light L1 is scattered when encountering the first microstructure 2004 to generate a predetermined light emitting effect. The second plate body 202 receives the second light L2 emitted by the second light-emitting component 222, so that the second light L2 enters an interior of the second plate body 202 for total reflection, and the second light L2 is scattered when encountering the second microstructure 2024 to generate a predetermined light emitting effect.

In some embodiments, the first microstructure 2004/the second microstructure 2024 is composed of a plurality of dots (or net dots, light dots), which may be convex dots or concave dots, but not limited thereto, and may be any shape such as an irregular shape, a cone, a square, a triangle, a trapezoid, etc. In some examples, the dots may be concave dots recessed from a bottom surface of the first block 2000/the second block 2020, or may be convex dots protruding outward from the bottom surface of the first block 2000/the second block 2020. A shape and a size of each dot, a distance between adjacent convex points, and/or a distance between adjacent concave points may be adjusted according to a shape of light emitted by the first light-emitting component 220/the second light-emitting component 222, a shape of a first transparent region 30/a second transparent region 32 in a plan view, and a material of the bottom surface and surface roughness of the first block 2000/the second block 2020, etc. The adjustment may be implemented through an experiment to obtain a better design solution. In some embodiments, the first microstructure 2004/the second microstructure 2024 may further be implemented by net dots or lines formed by printing ink on the bottom surface of the first block 2000/the second block 2020.

A light-shielding bar 24 is located on an outer periphery of the light guide plate 20. For example, the light-shielding bar 24 surrounds the light guide plate 20. Herein, the light-shielding bar 24 may prevent the first light L1/second light L2 emitted by the light source assembly 22 from leaking, furthering preventing light leakage. In addition, the light-shielding bar 24 extends at the intersection 240 between the first plate body 200 and the second plate body 202. Therefore, the light-shielding bar 24 blocks penetration of light between the first plate body 200 and the second plate body 202. In other words, ambient light, the first light L1, the second light L2, and other light do not penetrate through the intersection 240 to enter the first block 2000 and the second block 2020. In detail, the light-shielding bar 24 extending from the outer edge to the intersection 240 may block the first light L1 emitted by the first light-emitting component 220 in the first block 2000 from being incident to an adjacent second block 2020, preventing the second microstructure 2024 of the second block 2020 from being erroneously irradiated by the first light L1 to produce a residual image. In some embodiments, a material of the light-shielding bar 24 may be opaque or light-absorbing plastic, such as but not limited to: polycarbonate (PC).

Further, when at least one of the plurality of first light-emitting components 220 is driven, the first light-emitting component 220 emits the first light L1 toward the first block 2000. When at least one of the plurality of second light-emitting components 222 is driven, the second light-emitting component 222 emits the second light L2 toward the second block 2020. Herein, the first light L1 is blocked by the light-shielding bar 24 at the intersection 240 and does not enter the second block 2020, and the second light L2 is blocked by the light-shielding bar 24 at the intersection 240 and does not enter the first block 2000.

Returning to FIG. 1, as shown in FIG. 1, the cover plate 3 is located on the light guide plate 20. The cover plate 3 includes a plurality of first transparent regions 30 and a plurality of second transparent regions 32. The plurality of first transparent regions 30 and the plurality of second transparent regions 32 respectively correspond to the plurality of first microstructures 2004 and the plurality of second microstructures 2024. Therefore, the first light L1 scattered by the first microstructure 2004 penetrates through the first transparent region 30, and the second light L2 scattered by the second microstructure 2024 penetrates through the second transparent region 32, to display a predetermined pattern to be viewed/touched by the user from above the cover plate 3. For example, when the first light-emitting component 220 is lit up in a region/individually, the second block 2020 in which the second light-emitting component 222 that is not lit up may prevent simultaneous image display, thereby reducing problems of adjacent light interference and a residual image for each first block 2000 and second block 2020 to independently display the predetermined pattern. In some embodiments, a surface of the cover plate 3 is smoothed or/and hardened to facilitate touch by the user and/or increase wear resistance. In some embodiments, a material of the cover plate 3 may be, but not limited to, an opaque or semi-transparent material, such as but not limited to a glass or a film such as polyester film (Mylar).

According to the foregoing structure, the backlight module 2 and the illuminated touch device thereof use the light-shielding bar 24 that extends at the intersection 240 between the first plate body 200 and the second plate body 202 to block penetration of light between the first plate body 200 and the second plate body 202, preventing any microstructure from being erroneously illuminated by light from an adjacent plate body and generating a residual image. In other words, when any light-emitting component is lit up in a region/individually, a block in which the light-emitting component is not lit up may prevent simultaneous image display, thereby reducing problems of adjacent light interference and a residual image, so that each block displays a predetermined pattern independently, facilitating view/touch by the user.

In some embodiments, as shown in FIG. 1, the first transparent region 30 and the second transparent region 32 are located on a same central axis (not shown). The central axis is parallel to an arrangement direction of the plurality of first light-emitting components 220, and the central axis is located between the first light-emitting component 220 and the second light-emitting component 222. In some embodiments, as shown in FIG. 3, the first transparent region 30 and the second transparent region 32 are bilaterally symmetrical relative to the central axis and are located on the central axis. In an example, the plurality of first transparent regions 30 and the plurality of second transparent regions 32 are arranged on the central axis in a staggered manner. Areas of the plurality of first transparent regions 30 and the plurality of second transparent regions 32 gradually changes to determine a to-be-displayed predetermined pattern, but not limited thereto.

Figure 4A:
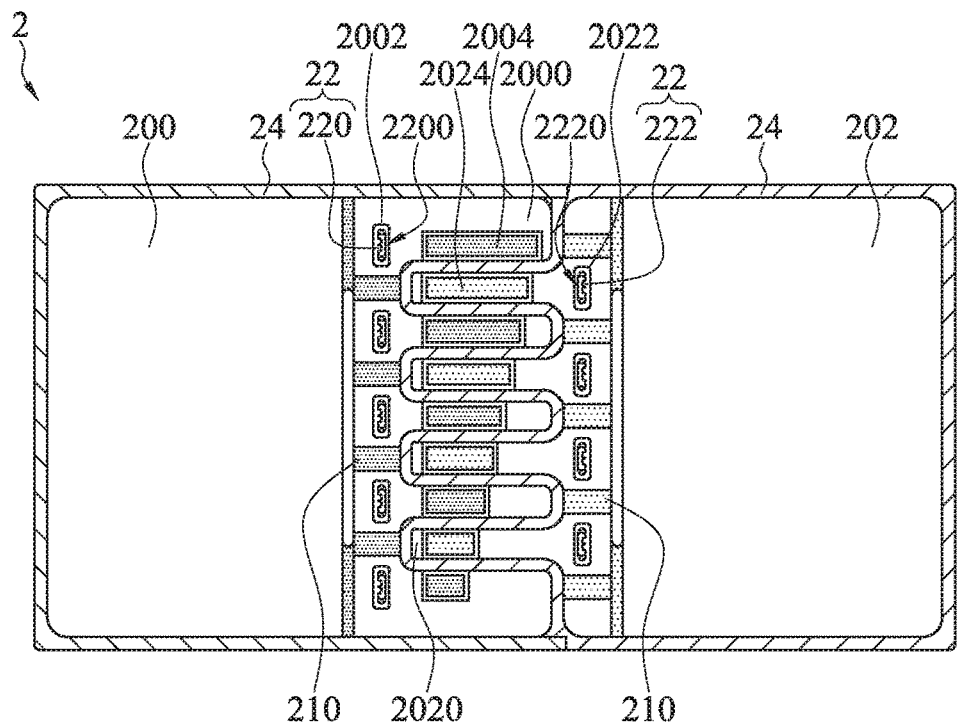
FIG. 4a is a schematic top view of a backlight module according to another embodiment.
Figure 4B:
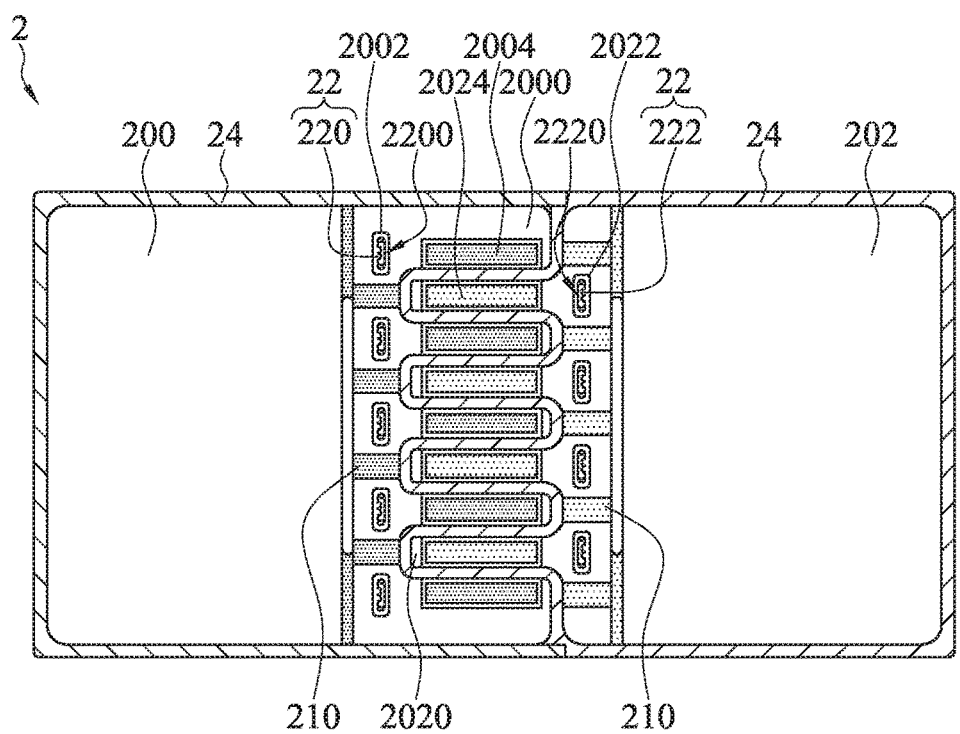
FIG. 4b is a schematic top view of a backlight module according to yet another embodiment.

Referring to FIG. 4a, in some embodiments, although a first transparent region 30 and a second transparent region 32 are located on a same central axis, the first transparent region and the second transparent region are geometrically asymmetrical relative to the central axis. Referring to FIG. 4b, in some embodiments, a plurality of first transparent regions 30 and a plurality of second transparent regions 32 are arranged on a central axis in a staggered manner. Areas of the plurality of first transparent regions 30 and the plurality of second transparent regions 32 are the same, and a to-be-displayed predetermined pattern is determined through the plurality of first transparent regions 30 and the plurality of second transparent regions 32.

Returning to FIG. 2, in some embodiments, there is a plurality of first accommodating spaces 204 between the plurality of first blocks 2000. The plurality of first accommodating spaces 204 correspond to the plurality of second blocks 2020. There is a plurality of second accommodating spaces 206 between the plurality of second blocks 2020. The plurality of second accommodating spaces 206 correspond to the plurality of first blocks 2000. Therefore, the first plate body 200 and the second plate body 202 are fitted with each other to form the light guide plate 20. In an example, a central axis of each of the first blocks 2000 is collinear with a central axis of each of the second accommodating spaces 206, and a central axis of each of the second blocks 2020 is collinear with a central axis of each of the first accommodating spaces 204. The plurality of first blocks 2000 and the plurality of second blocks 2020 are arranged in a staggered manner and fitted with each other. In some embodiments, the light-shielding bar 24 is in a continuous S-shape at the intersection 240 between the first plate body 200 and the second plate body 202, but not limited thereto. In one embodiment, as shown in FIG. 2, there are a plurality of first accommodating spaces 204 corresponding to the plurality of second blocks 2020 between the plurality of first blocks 2000, the plurality of first accommodating spaces 204 accommodate the plurality of second blocks 2020 in a stacked manner, and sides of the plurality of second blocks 2020 are disposed along sides of the plurality of first accommodating spaces 204.

Referring to both FIG. 1 and FIG. 2, in some embodiments, an area of the first microstructure 2004 is larger than an area of the first transparent region 30, and an area of the second microstructure 2024 is larger than an area of the second transparent region 32. Therefore, light intensity of the first light L1 emitted by the first light-emitting component 220 is reduced by a scattering effect of the second microstructure 2024, and light intensity of second light L2 emitted by the second light-emitting component 222 is reduced by a scattering effect of the first microstructure 2004, to prevent the first light L1 from reaching, through total reflection, an adjacent first block 2000, and further prevent the second light L2 from reaching, through total reflection, an adjacent second block 2020, reducing problems of adjacent light interference and a residual image.

Still referring to FIG. 3, in some embodiments, the first plate body 200 has a plurality of light-eliminating microstructures 210 between the plurality of first openings 2002, and the second plate body 202 further has a plurality of light-eliminating microstructures 210 between the plurality of second openings 2022. In other words, the light guide plate 20 has a plurality of light-eliminating microstructures 210 between the plurality of first openings 2002 and between the plurality of second openings 2022. Therefore, the plurality of light-eliminating microstructures 210 scatter the first light L1 to destroy total reflection of the first light L1 between the plurality of first openings 2002, to prevent the first light L1 from the first block 2000 from reaching, through total reflection, an adjacent first block 2000, or help to reduce a light intensity value when the first light L1 reaches the adjacent first block 2000. The plurality of light-eliminating microstructures 210 scatter the second light L2 to destroy total reflection of the second light L2 between the plurality of second openings 2022, to prevent the second light L2 from the second block 2020 from reaching, through total reflection, an adjacent second block 2020, or help to reduce a light intensity value when the second light L2 reaches the adjacent second block 2020. Herein, a plurality of light-eliminating microstructures 210 are configured to produce a dimming effect to prevent the first light L1/the second light L2 from spreading across regions to produce a residual image.

In some embodiments, the light-eliminating microstructure 210 is composed of a plurality of dots (or net dots, light dots), which may be convex dots or concave dots, but not limited thereto, and may be any shape such as an irregular shape, a cone, a square, a triangle, a trapezoid, etc. In some embodiments, the light-eliminating microstructure 210 may further be implemented by net dots or lines formed by printing ink on a bottom surface of the first plate body 200/the second plate body 202. Therefore, the light guide plate 20 absorbs residual light energy outside an independent light-emitting region by covering the net dots or lines in a path on which light energy is conducted, to prevent affecting other light-emitting regions.

In some embodiments, the backlight module 2 further includes a light-absorbing layer (not shown). The light-absorbing layer is located on at least one of a surface and a bottom surface of the light guide plate 20. In an example, both the light-absorbing layer and the plurality of light-eliminating microstructures 210 correspond to a non-functional region of the backlight module 2. Therefore, the light-absorbing layer absorbs the first light L1/second light L2 from any one of the first block 2000/second block 2020 or reduces a light intensity value of the first light L1/second light L2, to prevent the first light L1/second light L2 from reaching, through reflection, an adjacent first block 2000/second block 2020, that is, the light-absorbing layer is used as a light-reducing structure between adjacent blocks to reduce problems of adjacent light interference and a residual image. In some embodiments, the light-absorbing layer is formed by printing black paint on at least one of the surface and the bottom surface of the light guide plate 20.

In some embodiments, the backlight module 2 further includes an adhesive layer (not shown). The adhesive layer is located on at least one of the surface and the bottom surface of the light guide plate 20, and an orthographic projection of the adhesive layer on the light guide plate 20 overlaps the plurality of light-eliminating microstructures 210. Because the first light L1/second light L2 generates an optical phenomenon similar to ground glass when penetrating through the adhesive layer, the adhesive layer may be used as a light-reducing structure. Therefore, the adhesive layer absorbs the first light L1/second light L2 from any one of the first block 2000/second block 2020 or reduces a light intensity value of the first light L1/second light L2, to prevent the first light L1/second light L2 from reaching, through reflection, an adjacent first block 2000/second block 2020, that is, the adhesive is used as a light-reducing structure between adjacent blocks to reduce problems of adjacent light interference and a residual image. In some embodiments, the adhesive layer may be, but not limited to, a water glue layer with an opaque material or a light-absorbing material.

Returning to FIG. 1, in some embodiments, a reflective sheet 28 is located between the circuit board 1 and the light guide plate 20. The reflective sheet 28 includes a plurality of third openings 280. An orthographic projection of the plurality of third openings 280 on the light guide plate 20 overlaps the plurality of first openings 2002 and the plurality of second openings 2022, and the plurality of first light-emitting components 220 and the plurality of second light-emitting component 222 are located at the plurality of third openings 280 and protrude from the reflective sheet 28. Therefore, each of the first light-emitting components 220 and the second light-emitting components 222 respectively emits the first light L1 and the second light L2 through the first light-emitting surface 2200 and the second light-emitting surface 2220, and is incident from the plurality of third openings 280 to the first block 2000 and the second block 2020 of the light guide plate 20 in a side direction. The reflective sheet 28 reflects the first light L1 and the second light L2 leaking from the bottom surface of the light guide plate 20, to increase an amount of transmitted light entering the light guide plate 20 for total reflection. In some embodiments, the reflective sheet 28 is made on the circuit board 1 by film printing. In some embodiments, the reflective sheet 28 is made on the bottom surface of the light guide plate 20 by covering.

Figure 5:
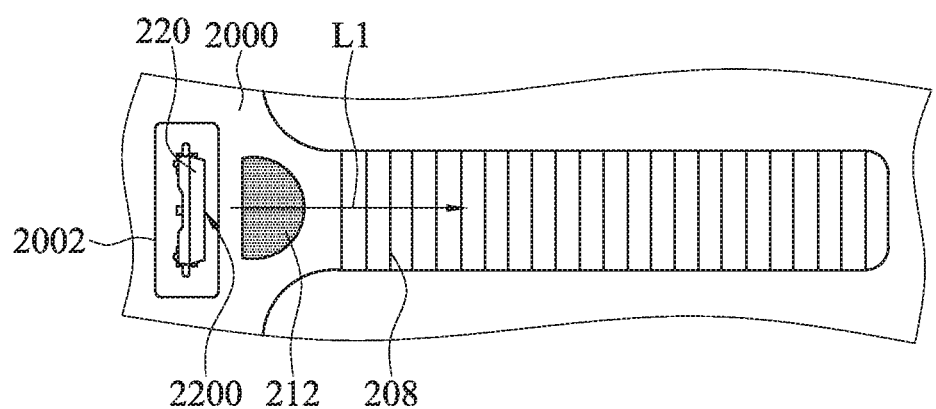
FIG. 5 is a schematic partially-enlarged top view of a backlight module according to an embodiment.

FIG. 5 illustrates a schematic partially-enlarged top view of a backlight module according to an embodiment. Referring to both FIG. 1 and FIG. 2, in some embodiments, the first block 2000 has a plurality of light-condensing microstructures 208 parallel to the first light-emitting surface 2200, and the second block 2020 further has a plurality of light-condensing microstructures 208 parallel to the second light-emitting surface 2220. In an example, the light-condensing microstructure 208 includes but is not limited to: a V-shaped groove and a circular arc groove. Therefore, a light-emitting angle of the first light-emitting component 220 and the second light-emitting component 222 may be converged to 60 to 70 degrees to increase light directivity.

In some embodiments, referring to both FIG. 3 and FIG. 5, the first light-emitting component 220 is located on the circuit board 1, and the circuit board 1 has a light-absorbing region 212 adjacent to the first light-emitting component 220. The first light-emitting component 220 protrudes from the first opening 2002 and emits the first light L1 through the first light-emitting surface 2200 to be incident to the first block 2000. Similarly, the second light-emitting component 222 is located on the circuit board 1, and the circuit board 1 has a light-absorbing region 212 adjacent to the second light-emitting component 222. The second light-emitting component 222 protrudes from the second opening 2022 and emits the second light L2 through the second light-emitting surface 2220 to be incident to the second block 2020. In other words, the circuit board 1 has a plurality of light-absorbing regions 212. The plurality of light-absorbing regions 212 is adjacent to the plurality of first light-emitting surfaces 2200 and the plurality of second light-emitting surfaces 2220. Therefore, the light-absorbing region 212 absorbs the first light L1 and the second light L2 from the first light-emitting surface 2200 and the second light-emitting surface 2220, and reduces a light intensity difference between center and two sides when the first light-emitting component 220 and the second light-emitting component 222 emit light, to prevent generation of a hot spot. Therefore, brightness of the first block 2000 and the second block 2020 in the light guide plate 20 is not too abrupt visually, to prevent a phenomenon of a light spot generated due to a close distance between the first light-emitting component 220 and the first microstructure 2004 and a close distance between the second light-emitting component 222 and the second microstructure 2024.

In some embodiments, the light-absorbing region 212 is formed by printing black paint on the circuit board 1. In some embodiments, design of a light-absorbing pattern, a geometric shape, and an area, etc. of the light-absorbing region 212 may be adjusted according to factors such as a light-emitting angle (a view angle) and emitted light intensity of the first light-emitting component 220, and a width of the first block 2000. The adjustment may be implemented through an experiment to obtain a better design solution.

In some embodiments, the light-absorbing region 212 is located on the light guide plate 20 and/or the reflective sheet 28 (not shown), for example: the light-absorbing region 212 is formed by printing black paint. Therefore, the light-absorbing region 212 absorbs the first light L1 and the second light L2 from the first light-emitting surface 2200 and the second light-emitting surface 2220, and reduces a light intensity difference between a center and two sides when the first light-emitting component 220 and the second light-emitting component 222 emit light, to prevent generation of a hot spot. Therefore, brightness of the first block 2000 and the second block 2020 in the light guide plate 20 is not too abrupt visually, to prevent a phenomenon of a light spot generated due to a close distance between the first light-emitting component 220 and the first microstructure 2004 and a close distance between the second light-emitting component 222 and the second microstructure 2024.

Based on the foregoing, according to some embodiments, the backlight module 2 and the illuminated touch device thereof use the light-shielding bar 24 that extends at the intersection 240 between the first plate body 200 and the second plate body 202 to block penetration of light between the first plate body 200 and the second plate body 202, preventing any microstructure from being erroneously illuminated by light from an adjacent plate body and generating a residual image. In other words, when any light-emitting component is lit up in a region/individually, a block in which the light-emitting component is not lit up may prevent simultaneous image display, thereby reducing problems of adjacent light interference and a residual image, so that each block displays a predetermined pattern independently, facilitating view/touch by the user. In addition, in some embodiments, at least one of the circuit board 1, the light guide plate 20, and the reflective sheet 28 has the light-absorbing region 212, and therefore the light-absorbing region 212 absorbs the first light L1 and the second light L2 from the first light-emitting surface 2200 and the second light-emitting surface 2220, to reduce the light intensity difference between the center and the two sides when the first light-emitting component 220 and the second light-emitting component 222 emit light, preventing too abrupt brightness of the first block 2000 and the second block 2020 visually, and reducing the phenomenon of light spot.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An illuminated touch device, comprising:
    a circuit board comprising a touch circuit; and
    a backlight module on the circuit board and comprising:
        a light guide plate comprising a first plate body and a second plate body fitted with each other, the first plate body comprising a plurality of first blocks and a plurality of first openings aligned with the plurality of first blocks, and the second plate body comprising a plurality of second blocks and a plurality of second openings aligned with the plurality of second blocks, wherein the plurality of first blocks have a plurality of first microstructures, and the plurality of second blocks have a plurality of second microstructures;
        a light source assembly electrically connected to the circuit board and comprising a plurality of first light-emitting components and a plurality of second light-emitting components arranged opposite to each other in a staggered manner, wherein each of the first light-emitting components has a first light-emitting surface, each of the second light-emitting components has a second light-emitting surface, the plurality of first light-emitting components respectively protrude from the plurality of first openings and face the plurality of first blocks with the plurality of first light-emitting surfaces, and the plurality of second light-emitting components respectively protrude from the plurality of second openings and face the plurality of second blocks with the plurality of second light-emitting surfaces; and
        a light-shielding bar at an outer periphery of the light guide plate and extending at an intersection between the first plate body and the second plate body, for blocking penetration of light between the first plate body and the second plate body; and
    a cover plate on the light guide plate and comprising a plurality of first transparent regions and a plurality of second transparent regions respectively corresponding to the plurality of first microstructures and the plurality of second microstructures;
    wherein there are a plurality of first accommodating spaces corresponding to the plurality of second blocks between the plurality of first blocks, there are a plurality of second accommodating spaces corresponding to the plurality of first blocks between the plurality of second blocks, and the light-shielding bar is in a continuous S-shape at the intersection between the first plate body and the second plate body.

2. The illuminated touch device according to claim 1, wherein at least one of the plurality of first light-emitting components is configured to emit a first light toward the first block when driven, at least one of the plurality of second light-emitting components is configured to emit a second light toward the second block when driven, the first light is blocked by the light-shielding bar at the intersection and fails to enter the second block, and the second light is blocked by the light-shielding bar at the intersection and fails to enter the first block.

3. The illuminated touch device according to claim 1, wherein the first block and the second block have a plurality of light-condensing microstructures respectively parallel to the first light-emitting surface and the second light-emitting surface, and the light-condensing microstructure comprises a V-shaped groove and a circular arc groove.

4. The illuminated touch device according to claim 1, wherein the light guide plate has a plurality of light-eliminating microstructures between the plurality of first openings and between the plurality of second openings.

5. The illuminated touch device according to claim 1, wherein the circuit board has a plurality of light-absorbing regions adjacent to the plurality of first light-emitting surfaces and the plurality of second light-emitting surfaces.

6. The illuminated touch device according to claim 1, further comprising:
    a reflective sheet between the circuit board and the light guide plate and comprising a plurality of third openings, wherein an orthographic projection of the plurality of third openings on the light guide plate overlaps the plurality of first openings and the plurality of second openings, and the plurality of first light-emitting components and the plurality of second light-emitting components are at the plurality of third openings and protrude from the reflective sheet.

7. The illuminated touch device according to claim 1, wherein the first transparent region and the second transparent region are on a same central axis and are bilaterally symmetrical.

8. A backlight module suitable for being electrically connected to a circuit board and comprising:
   a light guide plate comprising a first plate body and a second plate body fitted with each other, the first plate body comprising a plurality of first blocks and a plurality of first openings aligned with the plurality of first blocks, and the second plate body comprising a plurality of second blocks and a plurality of second openings aligned with the plurality of second blocks, wherein the plurality of first blocks have a plurality of first microstructures, and the plurality of second blocks have a plurality of second microstructures;
   a light source assembly electrically connected to the circuit board and comprising a plurality of first light-emitting components and a plurality of second light-emitting components arranged opposite to each other in a staggered manner, wherein each of the first light-emitting components has a first light-emitting surface, each of the second light-emitting components has a second light-emitting surface, the plurality of first light-emitting components respectively protrude from the plurality of first openings and face the plurality of first blocks with the plurality of first light-emitting surfaces, and the plurality of second light-emitting components respectively protrude from the plurality of second openings and face the plurality of second blocks with the plurality of second light-emitting surfaces; and
   a light-shielding bar at an outer periphery of the light guide plate and extending at an intersection between the first plate body and the second plate body, for blocking penetration of light between the first plate body and the second plate body;
   wherein there are a plurality of first accommodating spaces corresponding to the plurality of second blocks between the plurality of first blocks, there are a plurality of second accommodating spaces corresponding to the plurality of first blocks between the plurality of second blocks, and the light-shielding bar is in a continuous S-shape at the intersection between the first plate body and the second plate body.

9. The backlight module according to claim 8, wherein at least one of the plurality of first light-emitting components is configured to emit a first light toward the first block when driven, at least one of the plurality of second light-emitting components is configured to emit a second light toward the second block when driven, the first light is blocked by the light-shielding bar at the intersection and fails to enter the second block, and the second light is blocked by the light-shielding bar at the intersection and fails to enter the first block.

10. The backlight module according to claim 8, wherein the first block and the second block have a plurality of light-condensing microstructures respectively parallel to the first light-emitting surface and the second light-emitting surface, and the light-condensing microstructure comprises a V-shaped groove and a circular arc groove.

11. The backlight module according to claim 8, wherein the light guide plate has a plurality of light-eliminating microstructures between the plurality of first openings and between the plurality of second openings.

12. The backlight module according to claim 8, further comprising:
   a reflective sheet below the light guide plate and comprising a plurality of third openings, wherein an orthographic projection of the plurality of third openings on the light guide plate overlaps the plurality of first openings and the plurality of second openings, and the plurality of first light-emitting components and the plurality of second light-emitting components are at the plurality of third openings and protrude from the reflective sheet.

13. A backlight module suitable for being electrically connected to a circuit board and comprising:
   a light guide plate comprising a first plate body and a second plate body fitted with each other, the first plate body comprising a plurality of first blocks and a plurality of first openings aligned with the plurality of first blocks, and the second plate body comprising a plurality of second blocks and a plurality of second openings aligned with the plurality of second blocks, wherein the plurality of first blocks have a plurality of first microstructures, and the plurality of second blocks have a plurality of second microstructures, wherein there are a plurality of first accommodating spaces corresponding to the plurality of second blocks between the plurality of first blocks, the plurality of first accommodating spaces accommodate the plurality of second blocks in a stacked manner, and sides of the second blocks are disposed along sides of the first accommodating spaces;
   a light source assembly electrically connected to the circuit board and comprising a plurality of first light-emitting components and a plurality of second light-emitting components arranged opposite to each other in a staggered manner, wherein each of the first light-emitting components has a first light-emitting surface, each of the second light-emitting components has a second light-emitting surface, the plurality of first light-emitting components respectively protrude from the plurality of first openings and face the plurality of first blocks with the plurality of first light-emitting surfaces, and the plurality of second light-emitting components respectively protrude from the plurality of second openings and face the plurality of second blocks with the plurality of second light-emitting surfaces; and
   a light-shielding bar at an outer periphery of the light guide plate and extending at an intersection between the first plate body and the second plate body, for blocking penetration of light between the first plate body and the second plate body.

14. The backlight module according to claim 13, wherein at least one of the plurality of first light-emitting components is configured to emit a first light toward the first block when driven, at least one of the plurality of second light-emitting components is configured to emit a second light toward the second block when driven, the first light is blocked by the light-shielding bar at the intersection and fails to enter the second block, and the second light is blocked by the light-shielding bar at the intersection and fails to enter the first block.

15. The backlight module according to claim 13, wherein the first block and the second block have a plurality of light-condensing microstructures respectively parallel to the first light-emitting surface and the second light-emitting surface, and the light-condensing microstructure comprises a V-shaped groove and a circular arc groove.

16. The backlight module according to claim 13, wherein the light guide plate has a plurality of light-eliminating microstructures between the plurality of first openings and between the plurality of second openings.

17. The backlight module according to claim 13, further comprising:
  a reflective sheet below the light guide plate and comprising a plurality of third openings, wherein an orthographic projection of the plurality of third openings on the light guide plate overlaps the plurality of first openings and the plurality of second openings, and the plurality of first light-emitting components and the plurality of second light-emitting components are at the plurality of third openings and protrude from the reflective sheet.

* * * * *